United States Patent [19]

Lobdell

[11] 4,163,721
[45] Aug. 7, 1979

[54] EDGE SEALED PLEATED MEMBRANE

[75] Inventor: Donn D. Lobdell, Golden, Colo.

[73] Assignee: Cobe Laboratories, Inc., Lakewood, Colo.

[21] Appl. No.: 906,064

[22] Filed: May 15, 1978

Related U.S. Application Data

[63] Continuation of Ser. No. 784,362, Apr. 4, 1977, abandoned.

[51] Int. Cl.² .................... B01D 31/00; B01D 13/00
[52] U.S. Cl. .............................. 210/232; 210/321 B; 210/493 M
[58] Field of Search ................ 210/321 B, 493 M, 232

[56] References Cited

U.S. PATENT DOCUMENTS

| 3,765,537 | 10/1973 | Rosenberg | 210/446 |
| 3,780,870 | 12/1973 | Esmond | 210/321 B |
| 3,788,482 | 1/1974 | Markley | 210/321 B |
| 3,864,265 | 2/1975 | Markley | 210/321 B |
| 4,009,108 | 2/1977 | Miller et al. | 210/321 B |

Primary Examiner—Frank A. Spear, Jr.

[57] ABSTRACT

A fluid flow transfer apparatus comprising a pleated membrane and a housing having a pair of generally U-shaped interfitting casings. One of the casings fits within the other to define a central fluid chamber in which the membrane is positioned and a pair of outer sealing compartments. The two outermost flaps of the membrane extend into the respective sealing compartments, where they are sealed to the housing.

6 Claims, 6 Drawing Figures

U.S. Patent    Aug. 7, 1979    Sheet 2 of 2    4,163,721
FIG 4
FIG 5
FIG 6
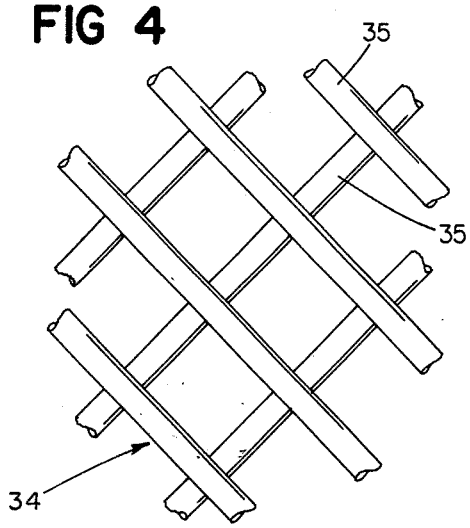
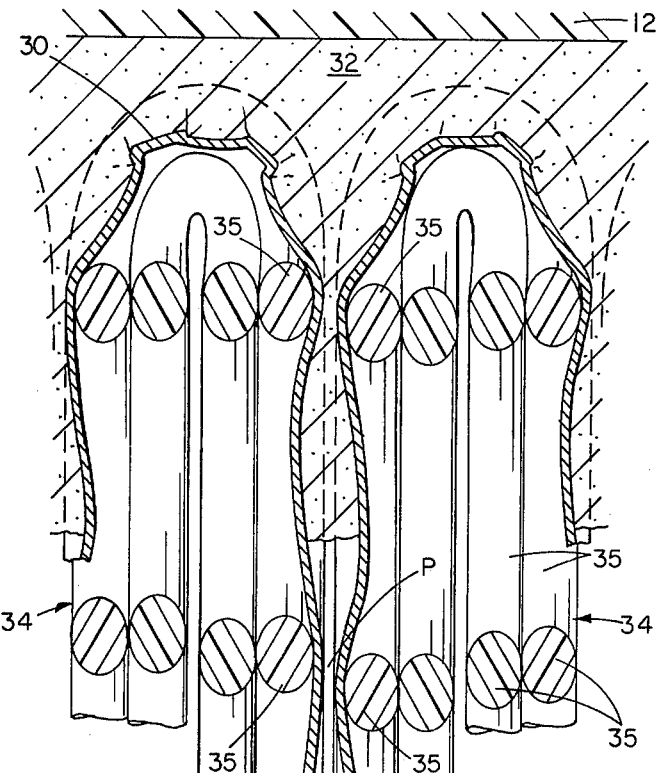
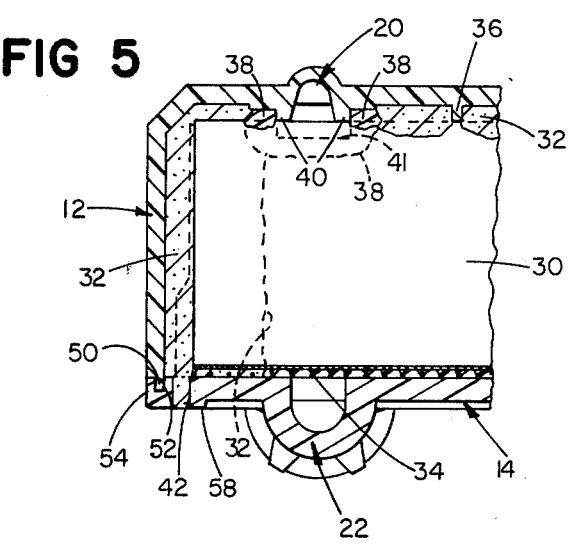
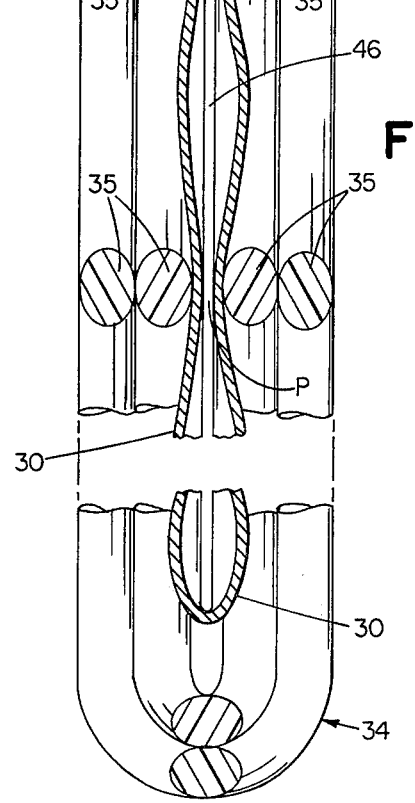

EDGE SEALED PLEATED MEMBRANE

This is a continuation of application Ser. No. 784,362, filed Apr. 4, 1977, now abandoned.

FIELD OF THE INVENTION

This invention relates to fluid flow transfer devices employing a pleated membrane.

BACKGROUND OF THE INVENTION

In constructing a pleated-membrane fluid flow transfer device, the outermost flaps of the pleated membrane have been sealed inside the apparatus housing, which also serves as the fluid chamber where fluids are passed on both sides of the membrane. One such construction is shown in Markley U.S. Pat. No. 3,788,482. It would be desirable from a manufacturing standpoint to do the sealing of the flaps in an area separate from the fluid flow chamber, as well as desirable to keep unnecessary potting out of the fluid flow chamber in order to minimize chance of blockage of flow passages.

SUMMARY OF THE INVENTION

I have discovered that simple membrane flap sealing can be effected in a fluid flow transfer apparatus having a pleated membrane by providing a housing having a pair of generally U-shaped, interfitting casings. One of the casings fits within the other to define a central fluid chamber in which the membrane is positioned and a pair of outer sealing compartments. The two outermost flaps of the membrane extend into the respective sealing compartments, where they are sealed to the housing. Such an apparatus is easy to manufacture, provides a very effective flap seal for the membrane, and keeps potting for the flap seal out of the fluid flow chamber.

In particular aspects the invention includes an outwardly extending shelf portion on the narrower casing to act as a stop against sidewalls of the wider casing, to keep the two casings internally spaced apart.

PREFERRED EMBODIMENT

We turn now to description of the presently preferred embodiment of the invention.

DRAWINGS

FIG. 4 is an enlarged perspective view of a portion of the support netting of FIG. 3;

FIG. 5 is a sectional view along 5—5 of FIG. 1; and

FIG. 6 is a greatly enlarged vertical sectional view like that of FIG. 2 of a portion of the membrane and support netting of the embodiment of FIG. 1.

DESCRIPTION

Figure 1:
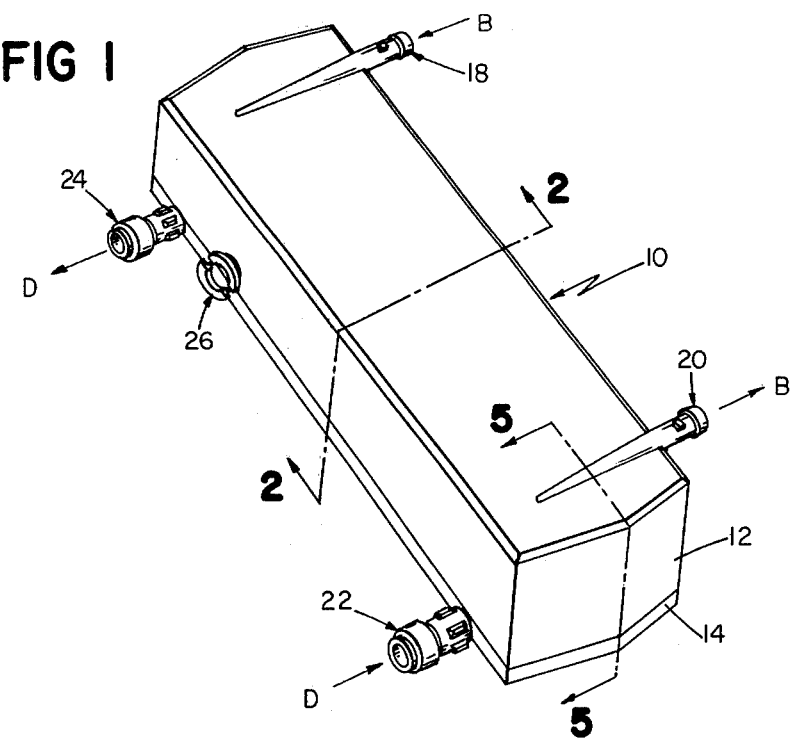
FIG. 1 is a perspective view of the presently preferred embodiment.

The embodiment shown in the drawings and its method of manufacture and operation are now described.

1. Embodiment and Method of Manufacture

Figure 2:
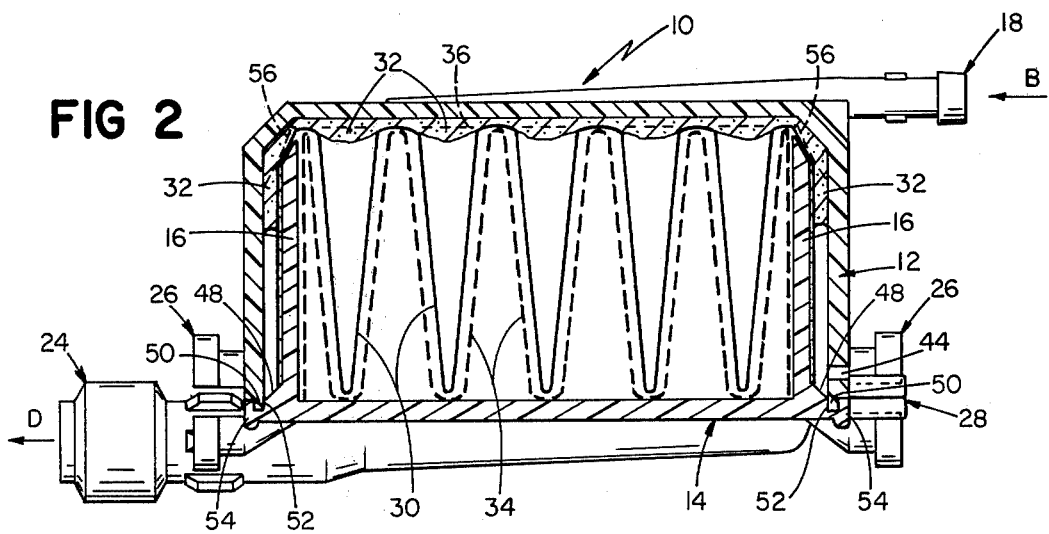
FIG. 2 is a somewhat diagrammatic sectional view along 2—2 of FIG. 1.

FIGS. 1 and 2 show dialyzer 10, which includes a two-part housing comprising trough-shaped polycarbonate casing 12 and interfitting polycarbonate casing 14, which is open at both longitudinal ends and has a pair of longitudinal fins 16. Casing 12 includes inlet 18 and outlet 20, both integrally molded therewith. Casing 14 includes integrally molded inlet 22 and outlet 24. Inlets 18 and 22 and outlets 20 and 24 become channels of steadily decreasing cross section when they enter their respective casings. A pair of stub shafts 26, formed by mating semicircular portions on casings 12 and 14, and a pair of cooperating stops 28 (only one is shown in FIG. 2), spaced equidistantly longitudinally from the right stub shaft, permit rotatable, vertical mounting of the dialyzer on a bracket, for degassing and normal operation.

Figure 3:
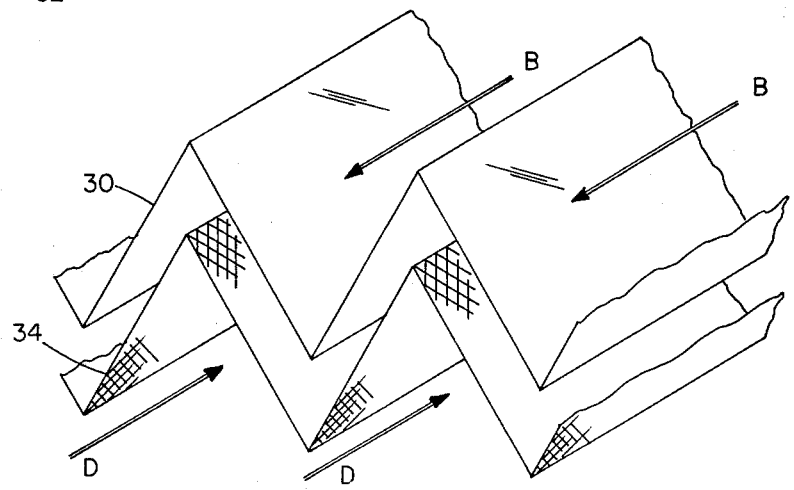
FIG. 3 is an exploded view of a portion of the membrane and support netting of the embodiment of FIG. 1.

Dialysis membrane 30, a Cuprophan (trademark of Enka Glanzstoff AG) cuprammonium cellophane sheet having a generally accordion pleated configuration, is squeezed between fins 16, and is sealed with polyurethane potting 32 along its outermost flaps to the outer faces of the fins. The folded upper tips of membrane 30, shown somewhat rounded in FIG. 2, are affixed to casing 12 by being anchored in polyurethane potting 32, thereby forming a series of separate parallel fluid flow passages, indicated by B in FIG. 3, in the valleys above the membrane. Potting of the upper tips prevents shunting of fluid directly from inlet 18 to outlet 20 without entering passages B. Support netting 34, a nonwoven polypropylene mesh (see the arrangement of its strands 35 in FIG. 4) sold under the Du Pont trademark Vexar, is also in the form of an accordion pleated sheet, and is positioned within membrane 30 on the membrane side adjacent casing 14 (FIG. 3). By this configuration, support netting 34 spaces apart the underside faces of adjacent membrane walls with two layers of the netting shown in FIG. 4, and provides parallel fluid flow passages underneath the membrane, indicated by D in FIG. 3. Netting 34 is not bonded to either casing, except at its longitudinal ends, as will be described hereinafter, and unlike membrane 30 does not fold over fins 16.

Both membrane 30 and netting 34 are pleated along generally parallel lines, and strands 35 run at 45° to those lines.

Casing 12 has a continuous peripheral ridge 50 that seats in continuous peripheral groove 52 of shelf portion 54, which surrounds casing 14. When casing 12 and casing 14 are so interfitted, the tips of fins 16 are vertically spaced from the adjacent inner surface of casing 12 and from ribs 36 running transversely on that surface, to avoid cutting of membrane 30 between the pointed fin tip and casing 12.

Longitudinal ends of membrane 30 and netting 34 are bonded to casings 12 and 14 by potting 32 (FIG. 5). Transverse ribs 36 (one shown in FIGS. 2 and 5) of casing 12 space the folded tips of membrane 30 from the casing ceiling to provide channels for flow of potting 32 during construction of dialyzer 10, described hereinafter. Ribs 36 have arcuate portions 56 which laterally space fins 16 from the angled and vertical sidewalls of casing 12 by tangential contact with fins 16 through membrane 30; portions 56 permit the flow channels to extend from the central fluid chamber between fins 16 to the side compartments between each fin and the corresponding sidewall of casing 12. A continuous ridge of General Electric RTV 108 thixotropic silicone rubber adhesive 38 adjacent casing ribs 40 surrounds the channel portion of outlet 20 (and in the same way inlet 18, though not shown) and bonds to the membrane tips, to act as a formed-in-place gasket in order to prevent flow of potting 32 into the channel area during construction. The adhesive needs to be thixotropic so that it will not itself wick across the membrane folds in the manifold area and thus block entrances to passages B. Inlet 18 and outlet 20 thus cooperate along their channel portions with membrane 30 to form inlet and outlet manifolds into and out of the fluid passages indicated at B in FIG. 3. Likewise inlet 22 and outlet 24 cooperate along their channel portions with membrane 30 on its underside to form inlet and outlet manifolds into and out of the fluid passages indicated at D in FIG. 3.

In constructing dialyzer 10, one pleats a sheet of membrane 30, pleats a sheet of netting 34, and combines the two by placing each fold of netting within a corresponding fold of membrane (FIG. 3). The resultant membrane-netting stack is squeezed together and placed in a casing 14 between fins 16, with each of the two outermost flaps of membrane 30 folded over its respective fin. Each outermost flap is then sealed to the outer face of the adjacent fin 16 with polyurethane potting 32. Casing 12 is then provided, and two ridges of silicone rubber adhesive 38, each having a weight of approximately one gram, are then applied around the outer edges of the channel portions of inlet 18 and outlet 20 of casing 12, adjacent ribs 40 and on end shoulders 41 (one shown in FIG. 5). Casing 14 is then interfitted with casing 12. Ridge 50 is wetted with solvent and then pressed into groove 52, to which it bonds on drying. A ramp portion 48 running along the base of each fin 16 serves to guide ridge 50 into groove 52. The interfitting is done while the silicone adhesive 38 is still wet so that it will seep a short way (about 1/16 to ⅛ inch) into the membrane folds to prevent wicking of polyurethane potting in the folds in the manifold area and consequent undesirable blockage of fluid flow into or out of the folds. The membrane and netting longitudinal ends are then potted in polyurethane 32, which is applied through holes 42 in casing 14 at each end thereof by a needle inserted through tapes (not shown) placed on raised portions 58 and covering the holes 42 (only one hole is shown in FIG. 5). Dialyzer 10 is held vertical during this process, with the end to be potted at the bottom. After curing of the potting at the end, the dialyzer is rotated 180°, with the other end at the bottom, ready to receive its potting. Potting seeps into the netting side of the membrane but not generally into the other side (FIG. 5). Holes 42 are sealed with the hardened potting, and the tapes are removed.

The potting of the membrane tips and flaps to casing 12 now takes place. Dialyzer 10 is positioned horizontally with the membrane tips to be potted below the membrane body and horizontally aligned, with casing 12 on the bottom (inverted from FIG. 2). Plugs (not shown) are placed in inlet 22 and outlet 24, and a needle is inserted through one of the plugs to apply 300 mmHg positive pressure from a pressure source through netting 34 against the face of membrane 30 adjacent casing 14. The pressure source is removed after pressurization is complete, and a pressure gauge is used to check for leaks. The plug maintains the pressure. Inlet 18 and outlet 20 are open to atmospheric pressure. Approximately 60 cc of polyurethane potting 32, which comprises an initially liquid mixture of Polyol 936 and Vorite 689, a urethane prepolymer, both manufactured by N. L. Industries, Bayonne, N.J., is then pumped into dialyzer 10 through hole 44 (FIG. 2) in one sidewall of casing 12. The potting flows into the side compartment formed between the sidewall of casing 12 and one fin 16 through channels between arcuate rib portions 56, down into the trough of casing 12, transversely through channels formed by 0.06 inch deep transverse ribs 36 (FIG. 5), and again through channels between arcuate portions 56 up into the other side compartment between the other sidewall of casing 12 and the other fin 16. Arcuate portions 56 prevent fins 16 from flaring outward to contact the sidewalls of casing 12 and thereby block potting flow into or out of the side compartments. A pair of pinholes (not shown) in casing 14, one adjacent inlet 22 and the other adjacent outlet 24, let air escape as the potting is pumped in. The potting settles uniformly on the inner surface of casing 12 and reaches the same level in each side compartment. Because of the positive pressure maintained on the opposite side of membrane 30, passages B are closed up, and the potting cannot wick or otherwise flow up between the folds. After a curing time of 60 minutes, one of the plugs is removed to permit a vacuum to be applied to the membrane side that initially received the higher pressure. Ten dialyzers 10 are connected in parallel to a vacuum pump through a 25 gauge one inch long needle acting as a pneumatic resistor, and the evacuation produces a negative pressure from 20 to 24 inches of mercury. The resistor chosen gives a desirable rate of evacuation. If evacuation is either too fast or too slow, unwanted bubbles will form in the polyurethane potting.

As a result of the evacuation, the folds of membrane 30 are drawn back from each other, enlarging the spaces between the folds, and are drawn tightly and even crushed against the folds of netting 34 (FIG. 6), which then support the membrane. The now more viscous potting can seep up into the spaces between the membrane folds to increase the bonding surface area provided by the membrane tips and thereby improve the casing-membrane bond effected by the potting. However, the potting is too viscous to seep undesirably far into those spaces so as to interfere with flow passages B. Curing time between the pressure and evacuation steps is important; if the time chosen for the particular potting compound is too short, the potting will not be viscous enough and will seep too far into the spaces between the membrane folds when the vacuum is applied, thus interfering with fluid flow passages B. If the time is too long, unwanted bubbles will form in the potting because of its increased viscosity.

After further curing, dialyzer 10 is ready for use.

Dimensions of dialyzer 10 are as follows. Its housing is approximately 12 inches by 3⅜ inches by 2 inches. Membrane 30 has a dry thickness of 13.5 microns and an actual surface area of approximately 1.54 m². Netting 34 has 16 strands per inch and a mean thickness of 0.022 inch. Both membrane and netting have 66 folds ("folds" meaning adjacent pairs of membrane or netting walls joined along a crease), which is equivalent to the number of upper tips of membrane 30 affixed to casing 12 (far fewer folds are shown in the somewhat diagrammatic view of FIG. 2). There are 65 fluid flow passages B along the folds. The channel portions of inlet 18 and outlet 20 are approximately 2¾ inches long, ⅝ inch wide and 5/32 inch deep adjacent the tubular portion of the inlet or outlet, which acts as a port, and ⅜ inch wide and 1/16 inch deep at the narrower channel tip. There are seventeen ribs 36, spaced about ½ inch apart, and seventeen corresponding pairs of arcuate portions 56. Additionally, there is a pair of arcuate portions 56 (not shown) between each longitudinal end of casing 12 and inlet 18 and outlet 20.

2. Operation

When used as a hemodialyzer, dialyzer 10 operates as follows. Blood tubing is connected to inlet 18 and outlet 20, and dialysate tubing is connected to inlet 22 and outlet 24. Dialyzer 10 is mounted vertically, with inlet 18 and outlet 24 on top. Blood is introduced into inlet 18, flows along its channel portion, and then, partly because of the potting 32, flows into the spaces B between the folds of membrane 30 and in the general direction indicated by arrows in FIG. 3, until it is collected in the channel portion of outlet 20 and then passes out of dialyzer 10. Dialyzing fluid or dialysate is introduced into inlet 22 and flows along its channel portion where it is distributed into all of the dialysate flow passages D (FIG. 3), and flows in the general direction indicated by arrows in FIG. 3, countercurrently with blood flow. It has been found that the membrane tips adjacent casing 14 do not need to be potted to it, when dialysate is introduced on this side. Dialysate is collected in the channel portion of outlet 24 and then passes out of dialyzer 10, from which it is collected for regeneration or disposal. Dialysis occurs across membrane 30. Blood is introduced into its inlet port with use of a pump while dialysate is introduced into its inlet port at a lower pressure. Thus in addition to removal of unwanted substances from the blood by dialysis, dialyzer 10 effects removal of water from the blood through membrane 30 because of the pressure difference across the membrane.

In normal operation dialysate flows upward because of the vertical positioning of dialyzer 10, and the dialysate flow paths D (FIG. 3) are constantly being degassed as dialysate flows in that direction. The blood flow paths B (FIG. 3) are degassed prior to dialysis by inverting dialyzer 10, introducing a saline priming solution, and having that solution flow upward for a predetermined time.

An enlarged view of the arrangement of support netting 34 and membrane 30 is shown in FIG. 6. Potting 32 has seeped somewhat into the space between the folds shown, to increase the bonding area and hence improve the bond between membrane tips and the potting. The pleated sheet configuration of netting 34 provides a spacer between adjacent membrane folds that is two layers thick. The effect is to increase the dialysate flow passages and to lower the dialysate pressure drop through the dialyzer. The double layer of netting tends not to entrap air bubbles, which on accumulating would impede dialysate flow and increase the pressure drop. Instead the bubbles desirably wash on through. As to blood flow, strands 35 tend to pinch adjacent folds of membrane 30 at spaced points designated P in FIG. 6. Between points P portions of folds of membrane 30 sag into inter-strand spaces of netting 34 to create separate blood flow passages 46. Pressure from the blood helps keep the membranes apart for blood flow.

Dialyzer 10 provides the following specifications and results when used in hemodialysis:

| Pressure Drops | |
|---|---|
| Blood (at flow rate, $Q_B$, of 200 ml/min. and Transmembrane Pressure (TMP) of 100 mmHg) (Hematocrit = 30%) | 15 mmHg |
| Dialysate (at flow rate, $Q_D$, 500 ml/min. and TMP of 100 mmHg) | 2 mmHg |
| In Vitro Clearances* | |
| ($Q_B$ = 200 ml/min. | |

-continued

| $Q_D$ = 500 ml/min. | TMP = 100 mmHg) |
|---|---|
| Urea | 140 ml/min. |
| Creatinine | 120 ml/min. |
| B-12 | 31 ml/min. |
| Ultrafiltration Rate (in vitro)* | 3.6 ml/hr/mmHg TMP |
| Blood Volume | |
| 100 mmHg TMP | 85 ml |
| 200 mmHg TMP | 120 ml |
| Dialysate Volume | 730 ml |
| Maximum TMP | 500 mmHg |

Performance subject to variations in Cuprophan membrane.

Variations and Modifications

The fluid flow transfer apparatus of the present invention has other applications beside that of hemodialysis; for example, it can be used in laboratory dialysis.

Other embodiments of the invention will be obvious to those skilled in the art.

Other Inventions

The method of injecting liquid potting material into a housing for uniform potting of the membrane tips to the housing was the invention of Thomas E. Goyne, whose U.S. patent application entitled "Potting Pleated Membrane" is Ser. No. 784,364, filed Apr. 4, 1977.

The method of sealing off fluid inlets and outlets from seepage of potting thereinto was the joint invention of Dennis Hlavinka and Frank Corbin, and their U.S. patent application entitled "Forming Fluid Manifold" is also Ser. No. 784,363, filed Apr. 4, 1977.

The pressure-evacuation two-step method for anchoring the membrane tips to the casing was the invention of Dennis J. Hlavinka, whose U.S. patent application entitled "Potting Pleated Membrane" is Ser. No. 810,956, filed June 29, 1977.

What is claimed is:

1. A fluid flow transfer apparatus comprising:
   a housing,
   a pleated membrane within said housing,
      said housing including first and second interfitting casings,
      said first and second casings each having a base and a pair of sidewalls in a generally U-shaped cross section, the sidewalls of said second casing fitting between the sidewalls of said first casing to define a fluid chamber between said bases,
      said sidewalls of said second casing being spaced along their outer surfaces from the inner surfaces of the respective sidewalls of said first casing, to define a pair of membrane sealing compartments, said membrane being contained in said fluid chamber but having a pair of opposed outermost flaps extending into but not beyond said membrane sealing compartments, where said membrane flaps are sealed to said housing,
      said sealing compartments being wide enough to allow introduction of adhesive into said sealing compartments after said casings are interfitted whereby adhesive can be placed on both surfaces of each of said outermost membrane flaps to bond each of them to said sidewalls defining each of said sealing compartments, said base of said second casing includes a pair of shelf portions, one of said pair extending outwardly beyond each of the sidewalls of said second casing for contacting each of said sidewalls of said first casing thereby to close said sealing compartments and fully enclose the ends of said outermost membrane flaps, said sidewalls of said second casing having tops that are spaced sufficiently from the inner surface of the base of said first casing along portions of the length of said sidewalls when said casings are interfitted so that said tops and said inner surface do not pinch said membrane along said sidewall length portions, and said housing further including means for connecting said first casing sidewalls to said second casing shelf portions to prevent adhesive in said sealing compartments from going to the outside of said housing.

2. The fluid flow transfer apparatus of claim 1 wherein said first casing is in the form of a trough having a pair of end walls and said membrane is pleated along a plurality of parallel lines extending between said end walls.

3. The fluid flow transfer apparatus of claim 2 wherein said shelf portions act as stops against the sidewalls of said first casing to keep said second sidewall tops so spaced from said base inner surface.

4. The fluid flow transfer apparatus of claim 3 wherein said sidewalls of said second casing are fins, tapering in cross section at their tops.

5. The fluid flow transfer apparatus of claim 3 wherein said means for connecting includes a ridge portion on each of said sidewalls of said first casing, a groove in each of said shelf portions positioned to receive each said ridge portion when said casings are interfitted, and means for holding each said ridge portion in each said groove.

6. The fluid flow transfer apparatus of claim 5 wherein there is a ramp portion between the foot of each of said sidewalls of said second casing and each of said shelf portions whereby each said ramp portion guides each said ridge portion of said first casing into said groove of each of said shelf portions.

* * * * *

UNITED STATES PATENT AND TRADEMARK OFFICE
CERTIFICATE OF CORRECTION

PATENT NO. : 4,163,721

DATED : August 7, 1979

INVENTOR(S) : Donn D. Lobdell

It is certified that error appears in the above-identified patent and that said Letters Patent are hereby corrected as shown below:

Column 4, line 60, "5/8 inch wide" is changed to --3/8 inch wide--.

Column 6, lines 32 and 33, "is also Ser. No. 784,363" is changed to --is Ser. No. 784,363--.

Signed and Sealed this

Eighteenth Day of December 1979

[SEAL]

Attest:

SIDNEY A. DIAMOND

Attesting Officer     Commissioner of Patents and Trademarks